US005086804A

United States Patent [19]

Ngai

[11] Patent Number: 5,086,804

[45] Date of Patent: Feb. 11, 1992

[54] EMERGENCY SECURITY DEVICE FOR HEAD OF A LEAKING GAS CYLINDER

[75] Inventor: Eugene Y. Ngai, Whitehouse Station, N.J.

[73] Assignee: Solkatronic Chemicals, Inc., Fairfield, N.J.

[21] Appl. No.: 644,550

[22] Filed: Jan. 23, 1991

[51] Int. Cl.[5] .......... F16K 37/00

[52] U.S. Cl. .......... 137/312; 55/274; 137/382

[58] Field of Search .......... 137/312, 382; 55/274

[56] References Cited

U.S. PATENT DOCUMENTS 3,323,541 6/1967 Schneider .......... 137/312
3,976,050 8/1976 Glasser .......... 55/274 X
4,494,666 1/1985 Cooper et al. .
4,625,627 12/1986 Livanos .......... 98/32
4,834,137 5/1989 Kawaguchi .......... 137/312 X

*Primary Examiner*—Alan Cohan
*Attorney, Agent, or Firm*—Willian Brinks Olds Hofer Gilson & Lione

[57] ABSTRACT

Emergency security device adapted to be used on a head leaking gas cylinder comprising a cap adapted to be tightly fitted on the gas cylinder and connected to a pressure cylinder containing a purging inert gas and to a dry scrubber assembly containing a material neutralizing the leaking gas carried away from the cap by the purging gas.

9 Claims, 1 Drawing Sheet

EMERGENCY SECURITY DEVICE FOR HEAD OF A LEAKING GAS CYLINDER

BACKGROUND OF THE INVENTION

1. Field of the Invention

This invention relates to an emergency security device particularly adapted to be used on a head of a leaking gas cylinder containing a toxic and/or corrosive gas.

2. Description of the Prior Art

The extensive use of toxic and corrosive gases in the industry has led to increasing government regulations on the handling of gas cylinders, with a special emphasis on emergency situations, such as leaks from the cylinder and particularly from the head part of such a cylinder. Up to now, three major devices have been designed and sold for use in controlling leaking gas cylinders.

a. Chlorine Institute Emergency Kit "A"

The chlorine kit "A" contains a pressure cap assembly which can seal the valve assembly of a chlorine cylinder with the use of a set of chains connected to the base of the cylinder. Such a device is effective but limited to use on low vapor pressure gases, such as sulfur dioxide or chlorine. It cannot be used for higher vapor pressure, such as arsine (1515 KPa) or hydrogen chloride (4330 KPa).

b. Cylinder Containment Vessel

In this case, such as disclosed in U.S. Pat. No. 4,494,666, the leaking gas cylinder is completely introduced into a high pressure containment vessel which is then tranported back to a safe area for disposal. However, these vessels are expensive and for larger cylinders they are heavy and cumbersome. The weight and size of these vessels prevents the ease of use in areas where a leaking cylinder may be. Moreover, it also makes it inconvenient for it to be carried, for example, on a delivery truck for immediate use.

c. Ventilated Gas Cabinets

Ventilated gas cabinets, such as described in U.S. Pat. No. 4,625,627, are routinely used in the Electronic Gas industry to safely contain cylinders during use. A typical cabinet is constructed of welded sheets of metal and is exhausted at the top. Leaking gas escaping from cylinders is rapidly diluted with air and exhausted to an appropriate treatment system. In all cases, the gas cabinets are fixed installations which require support facilities, such as fans and scrubbers. For emergency situations, unless a gas cabinet is nearby it cannot be setup immediately for use.

SUMMARY OF THE INVENTION

The invention described and claimed herein comprises a cap equipped with a threaded collar adapted to be tightly engaged onto a screw thread, usually provided on the head of a leaking cylinder, a sealing ring disposed in said cap and adapted to be tightly compressed between said cap and said cylinder by the engagement of said threaded collar, an inlet port in said cap connected by a first tubing to a cylinder containing a purging inert gas and an outlet port in said cap connected by a second tubing to a dry scrubbing assembly having an exit port and filled with a dry scrubbing material irreversibly reacting with the leaked gas carried away from the cap by the purging inert gas, said purging inert gas escaping through said exit (outlet) port.

Among the objects of the present invention are the following:

To provide a new and useful emergency security device permitting the immediate control of a leaking gas cylinder containing a toxic and/or corrosive gas.

To buy time for an emergency response team in adapting an emergency security device onto a leaking gas cylinder.

To permit a safe transport of a leaking gas cylinder to a known cylinder containment vessel or gas cabinet.

To provide a new and useful device for a rapid neutralization of a toxic and/or corrosive gas escaping from the head of a gas cylinder.

DESCRIPTION OF THE PREFERRED EMBODIMENT

Figure 1:
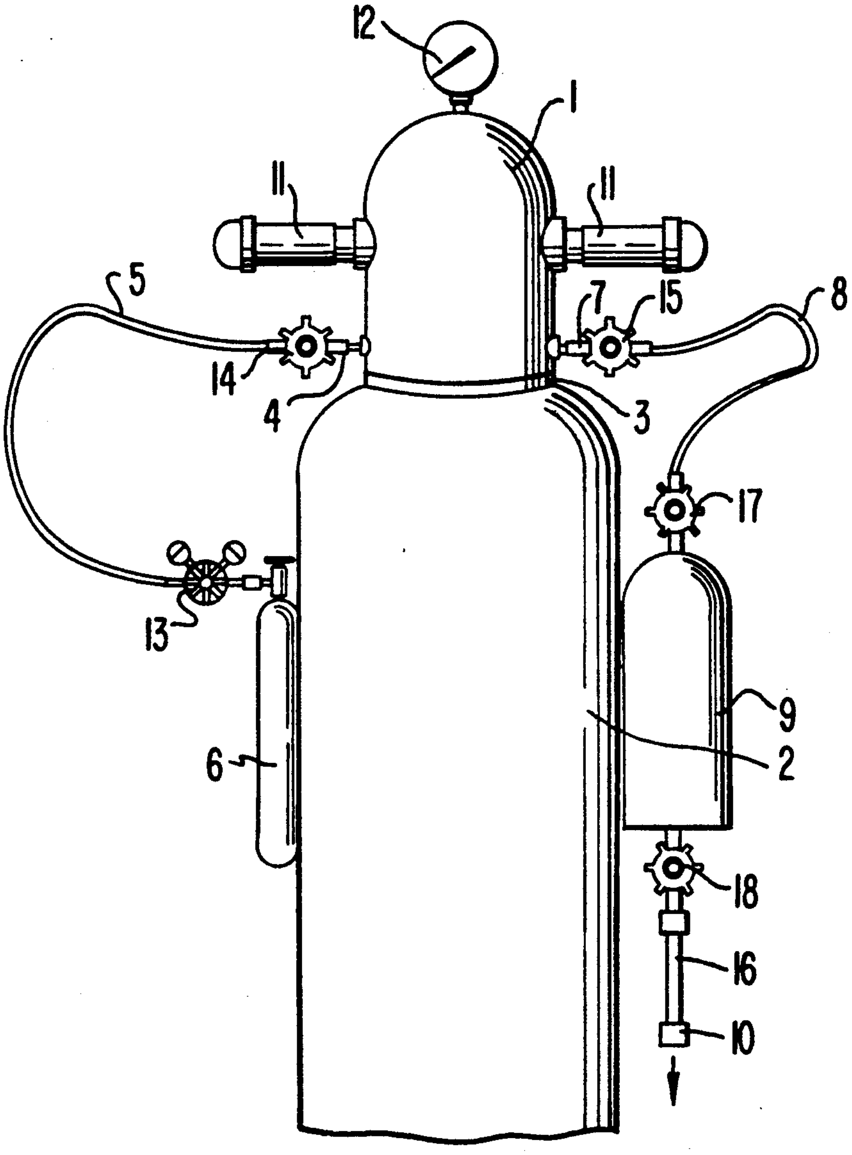
FIG. 1 is a partial view of a gas cylinder equipped with an emergency security device according to the present invention.

As shown in FIG. 1, the emergency security device according to the invention comprises a cap (1) equipped with an internal threaded collar (non represented) adapted to be tightly engaged onto a screw thread generally provided on the head of a gas cylinder (2), and with a sealing ring (3) disposed in said cap and adapted to be compressed between the cap (1) and the cylinder (2) by the tight screwing of said cap onto said cylinder in order to provide a secure, gas impermeable joint between these parts. The cap, preferably oversized, is made from a metal which is preferably resistant to the gas contained in the cylinder and the sealing ring is molded from a thermoplastic elastomer which is also preferably resistant to said gas.

The cap (1) is further equipped with an inlet port (4) connected by a first tubing (5) to a cylinder (6) containing a purging inert gas and with an outlet port (7) connected by a second tubing (8) to a dry scrubbing assembly (9) having an exit port (10) and filled with a dry scrubbing material irreversibily reacting with the leaked gas escaping from the head of the gas cylinder (2) and carried away from the cap (1) by the purging inert gas, said purging gas escaping finally through the exit port (10). The tubings (5) and (8) may be rigid or flexible and may advangeously be equipped with closure valves (14) and (15).

The inlet port (4) and the outlet port (7) are generally disposed in the lateral wall portion of the cap and are preferably opposed.

The cap (1) may be advantageously further equipped with one or more fixed or detachable handles (11) allowing the cap to be easily tightly torqued onto the cylinder (2).

The cap (1) may be further equipped with a pressure gauge (12) for determining the leak integrity of the sealing ring (3) when the cap (1) is disposed onto a leaking cylinder.

A pressure reducing regulator (13) may be disposed between the inlet port (4) and the cylinder (6) containing the inert purging gas.

The purging gas may be any inert gas, the preference being given to nitrogen and sulfur hexafluoride.

In order to control the consumption of the dry scrubbing material contained in the dry scrubbing assembly it may be useful to provide a solid indicator assembly (16) containing a dry reagent product giving a colored indication of the consumption of the dry scrubbing material. This solid indicator assembly is generally located on the exit port (10) of the dry scrubbing assembly (9).

The dry scrubbing assembly (9) is advantageously equipped on both sides with closing valves (17) and (18) which are closed when a spent dry scrubbing assembly has to by replaced by a new one.

The nature of the dry scrubbing material and of the dry reagent contained in the solid indicator assembly (16) have to be chosen according to the nature of the gas contained in the gas cylinder (2).

When the gas, cylinder contains as acid gas such as, for example, chlorine, dichlorosilane, boron trichloride, hydrogen chloride, silicon tetrachloride, trichlorosilane a.s.n., the dry scrubbing assembly preferably contains a high surface area carbon or alumina pellets impregnated with an alkali, such as sodium hydroxide, which is transformed into sodium chloride by reaction with chloride gas. In this case, the dry indicator assembly is charged with SODASORB pellets (mixture of hydrated lime, sodium hydroxide and potassium hydroxide) impregnated with ethyl violet indicator, this white product turning into a grey/purple color when the dry scrubbing material is spent.

When the gas cylinder contains hydride gas such as, for example, arsine, germane, hydrogen sulfide, hydrogen selenide, phosphine or organometallic mixtures, such as dimethyl zinc or diethyl telluride, the dry scrubbing assembly preferably contains a high surface area carbon impregnated with oxides of copper or aluminum impregnated with potassium permanganate. In this case, the dry indicator assembly is charged with potassium permanganate impregnated alumina which changes in color from purple to brown when the dry scrubbing material is spent.

When the gas cylinder contains a fluoride gas, such, as for example, boron trifluoride, hydrogen flouride, silicon tetraflouride or tungsten hexafluoride, the dry scrubbing assembly is charged with barium oxide or calcium oxide. In this case, the dry indicator assembly is charged with SODASORB which changes color from white to grey/purple when the dry scrubbing material is spent.

In case of leak of a gas cylinder, the following procedure has to be followed by a minimum of two trained emergency team members wearing the appropriate personal protective equipment in order to put in place the emergency security device according to the invention:

1. check the valves of the cap to make sure they are closed 2. attach to leaking cylinder the purge cylinder and the appropriate dry scrubber assembly 3. tighten the cap onto the leaking cylinder and attach purge and scrubber lines 4. open purge cylinder and pressurize the cap in order to test the tightness of the sealing ring 5. vent pressure through the dry scrubber assembly 6. adjust regulator for an outlet flow of 4-5 psig When the preceding procedures are correctly executed, the emergency security device according to the invention permits a safe transportation of a leaking gas cylinder to a cylinder containment vessel or gas cabinet.

What is claimed is:

1. An emergency security device adapted to be used on a head of a leaking gas cylinder containing toxic and/or corrosive gases comprising a cap equipped with an internal threaded collar adapted to be tightly engaged onto a screw thread provided on the head of said cylinder, a sealing ring disposed in said cap and adapted to be tightly compressed between said cap and said cylinder by the engagement of said threaded collar, and inlet port in said cap connected by a first tubing to a cylinder containing a purging inert gas and an outlet port in said cap connected by a second tubing to a dry scrubbing assembly having an exit port and filled with a dry scrubbing material irreversibly reacting with the leaked gas carried away from the cap by the purging inert gas, said purging inert gas escaping through said exit port.

2. An emergency security device according to claim 1 in which the cap is equipped with at least one handle allowing the cap to be tightly torqued onto the leaking gas cylinder.

3. An emergency security device according to claim 1 further comprising a pressure gauge disposed on the cap for determining the leak integrity of the seal provided by the sealing ring when the cap is used.

4. An emergency security device according claim 1 further comprising a pressure reducing regulator disposed between the inlet port and the cylinder containing the purging inert gas.

5. An emergency security device according to claim 1 further comprising a solid indicator assembly giving a visual indication of the consumption of the dry scrubbing material.

6. An emergency security device according to claim 1 further comprising closure valves disposed on the first and second tubings.

7. An emergency security device according to claim 1 in which the purging inert gas is selected from the group consisting of nitrogen and sulfur hexafluoride.

8. An emergency security device according to claim 5 wherein the solid indicator assembly is connected to the exit port of the dry scrubbing assembly.

9. An emergency security device according to claim 1 which permits a safe transportation of the leaking gas cylinder to a cylinder containment vessel or gas cabinet.

* * * * *